United States Patent [19]

Andoh et al.

[11] Patent Number: 5,404,206
[45] Date of Patent: Apr. 4, 1995

[54] IMAGE SCANNING MECHANISM USING DIRECT DRIVE MECHANISM

[75] Inventors: Toshiyuki Andoh, Sagamihara; Masanori Saitoh, Komae; Toyokazu Satomi, Yokohama, all of Japan

[73] Assignee: Ricoh Company, Ltd., Tokyo, Japan

[21] Appl. No.: 166,939

[22] Filed: Dec. 15, 1993

[30] Foreign Application Priority Data

Dec. 18, 1992 [JP] Japan .................... 4-338218

[51] Int. Cl.$^6$ ........................... G03G 15/28
[52] U.S. Cl. ..................... 355/235; 355/234; 355/67; 355/75
[58] Field of Search ........... 355/228, 232–235, 355/67, 75; 358/496, 497; 318/135, 685, 687; 310/12

[56] References Cited

U.S. PATENT DOCUMENTS

| | | |
|---|---|---|
| 4,344,695 | 8/1982 | Satomi . |
| 4,371,255 | 2/1983 | Satomi . |
| 4,399,431 | 8/1983 | Satomi et al. . |
| 4,415,259 | 11/1983 | Satomi . |
| 4,436,407 | 3/1984 | Satomi et al. . |
| 4,472,048 | 9/1984 | Satomi . |
| 4,714,354 | 12/1987 | Satomi . |
| 4,893,196 | 1/1990 | Koshiyouji et al. ............ 358/497 X |
| 4,989,099 | 1/1991 | Koshiyouji et al. ............ 358/497 X |
| 5,015,936 | 5/1991 | Inoue ........................ 355/235 X |
| 5,097,290 | 3/1992 | Watanabe .................... 355/235 X |
| 5,105,117 | 4/1992 | Yamaguchi ................... 310/323 |
| 5,117,164 | 5/1992 | Ishii et al. ................. 355/235 X |
| 5,194,894 | 3/1993 | Nishio ...................... 355/235 X |
| 5,289,000 | 2/1994 | Toyofuko .................... 358/497 X |
| 5,289,088 | 2/1994 | Andoh ....................... 355/235 X |

FOREIGN PATENT DOCUMENTS

| | | | |
|---|---|---|---|
| 0167057 | 10/1982 | Japan | 355/235 |
| 0239236 | 10/1986 | Japan | 355/235 |
| 0239237 | 10/1986 | Japan | 355/235 |
| 3-46864 | 2/1991 | Japan . | |
| 3-55961 | 3/1991 | Japan . | |
| 0189663 | 8/1991 | Japan | 355/234 |
| 0188126 | 7/1992 | Japan | 355/233 |
| 0188127 | 7/1992 | Japan | 355/233 |
| 0188128 | 7/1992 | Japan | 355/233 |

OTHER PUBLICATIONS

Yoshiro Tomikawa, et al., "Motor Application Technique", pp. 194–203.
"Ultramodern actuator", pp. 145–150.

Primary Examiner—Matthew S. Smith
Attorney, Agent, or Firm—Oblon, Spivak, McClelland, Maier & Neustadt

[57] ABSTRACT

A direct driving mechanism moves, in a direct drive manner, at least one of a sheet, on which an original image to be read is realized, and an image reading system for reading the original image so that the image reading system progressively reads all of the original image accordingly. The image scanning mechanism has an arrangement for reading the original image realized on the sheet either in a first mode of sensing light reflected by the sheet or in a second mode of sensing light transmitted by the sheet. The arrangement includes at least two different kinds of driving mechanisms, each being used for a respective one of the first and second manners. At least one of the two different kinds of driving mechanisms includes the direct driving mechanism.

5 Claims, 5 Drawing Sheets

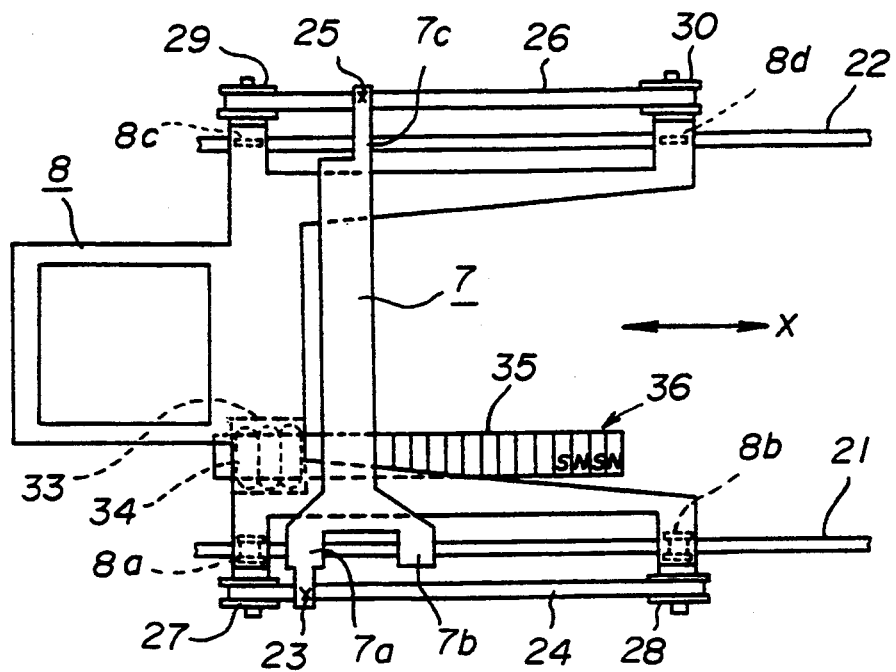

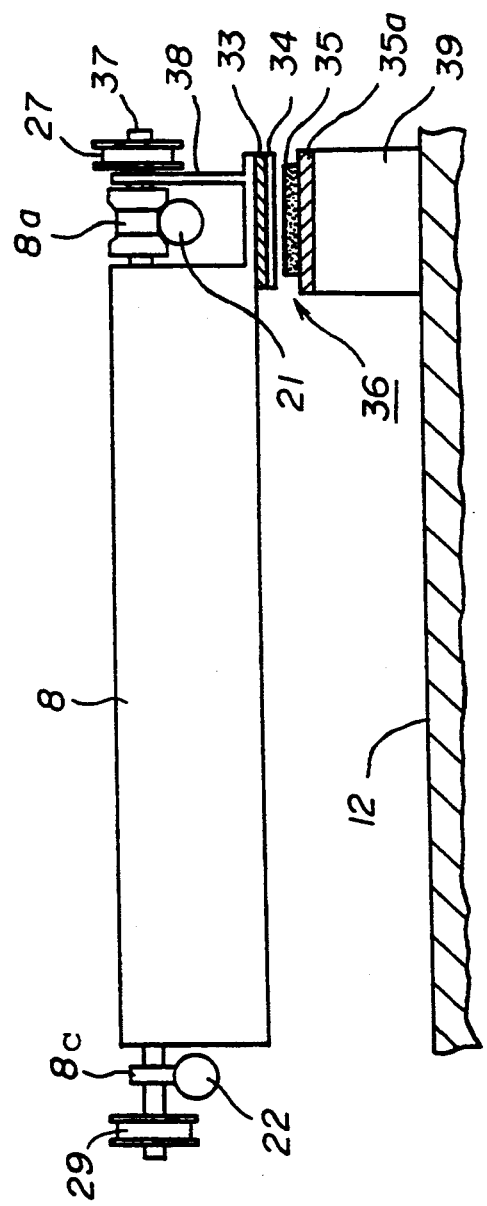

IMAGE SCANNING MECHANISM USING DIRECT DRIVE MECHANISM

BACKGROUND OF THE INVENTION

The present invention relates to an image scanning mechanism used in an image reading apparatus, and in particular relates to one for reading an original image realized on a sheet either by sensing light reflected by the sheet (image reading in such a manner will be referred to as reflection reading hereinafter) or sensing light transmitted by the sheet (image reading in such a manner will be referred to as transmission reading hereinafter). In the transmission reading, the sheet to be used comprises, for example, a transparency.

One example of an arrangement of such an image scanning mechanism will be described with reference to FIG. 1. Such a construction was proposed by the applicant the same as that of the present application, in Japanese Patent Application No. 4-33616 filed on Feb. 20, 1992, inventors of which are Toshiyuki Ando, Osamu Takase, Takahiro Asai, Makoto Hino and Yutaka Kaneko.

FIG. 1 shows an internal arrangement of an image reading apparatus using the above image scanning mechanism. (The shown arrangement is in accordance with that proposed by an application filed by the present applicant.) A contact glass 1, acting as a sheet table, is used for placing thereon a sheet 2, for reflection reading (such a sheet will be referred to as a reflecting sheet, hereinafter), on which an original image to be read is realized. Below the contact glass 1 is arranged, a light source 3 for illuminating the sheet 2, and reflecting mirrors 4, 5 and 6 constituting a reflection reading optical system. The light source 3 and the reflecting mirror 4 are mounted on a first carrier 7 and the mirror 5 and 6 are mounted on a second carrier 8. The following components are arranged along the path of light reflected by the reflecting mirror 6: an image-formation lens 9 for reflection reading; a light direction changing mirror 10 having a reflecting surface pivotably supported on a supporting point P; and a photosensitive element 11 (comprising a charge-coupled-device sensor, for example). The above-mentioned components constitute reflection-reading optical system A in the apparatus body 12 of this image reading apparatus.

A transmission-reading optical system B is provided on the left side of the apparatus body 12 as shown in FIG. 1 and described below. A contact glass 13, acting as a sheet table, is used for placing thereon a sheet 14, for transmission reading (such a sheet will be referred to as transmitting sheet, hereinafter), on which an original image to be read is realized. The contact glass 13 is linked to a second carrier 8. Above the contact glass 13, a light source 15 for illuminating the transmitting sheet 14, and a reflecting plate 16 and a diffusing plate 17 for guiding light onto the surface of the transmitting sheet 14 are arranged. Below the contact glass 13, a reflecting mirror 18 is provided. Along the path of light reflected by the reflecting mirror 18, an image-formation lens 19 for transmission reading and a reflecting mirror 20 are arranged. The light direction changing mirror 10 is oriented as indicated by the symbol R when the transmitting sheet 14 is read and is oriented as indicated by the symbol Q in FIG. 1 when the reflecting sheet 2 is read.

An operation of reading the reflecting sheet 2 in the arrangement shown in FIG. 1 will now be described. The first carrier 7 carrying the light source 3 and the reflecting mirror 4 and the second carrier 8 carrying the reflecting mirrors 5 and 6 are moved along the direction X (sub-scanning direction) shown in FIG. 1, the ratio of moving speeds between the first and second carrier 7 and 8 being 2:1. Thus, the entire original image realized on the reflecting sheet 2 is progressively read. The light reflected by the reflecting sheet 2, associated with the original image to be read, is then reflected by the reflecting mirrors 4, 5 and 6 successively. Then, after that, by means of the image-formation lens 9, the resulting light is used to form the relevant image on the photosensitive element 11, the formed image being then detected by the photosensitive element 11. The photosensitive element 11 outputs a signal corresponding to the detected image, the output signal being then processed by an image processing unit in the apparatus body 12 and not shown in FIG. 1.

Subsequently, an operation for reading the transmitting sheet 14 in the arrangement shown in FIG. 1 will now be described. The light emitted by the light source 15 is reflected by the reflecting plate 16 and diffused by the diffusing plate 17. Then, as a result, the resulting light uniformly illuminates an area, of the contact glass 13, corresponding to the position of the components 15, 18 and 17. Under the condition where the light illuminates the area of the contact glass 13 as mentioned above, the contact glass 13 is moved as a result of being driven together with the second carrier 8 along the direction X (sub-scanning direction) shown in FIG. 1 together with the transmitting sheet 14 placed thereon. Thus, the entire original image realized on the transmission sheet 14 is progressively read. The light transmitted by the transmitting sheet 14 is then reflected by the reflecting mirror 18 and then focused by the image-formation lens 19 so as to form the relevant image on the photosensitive element 11. Before the relevant image is formed on the photosensitive element 11, the light passing through the lens 19 is successively reflected by the reflecting mirror 20 and the light-direction change mirror 10. Then, after that, the photosensitive element 11 outputs a signal corresponding to the detected image, the output signal being then processed by the above-mentioned image processing unit in the apparatus body 12.

In the above arrangement, the sheet table (contact glass 13) used for reading the transmitting sheet 14, such as a transparency is linked to the second carrier 8 for reading the reflecting sheet 2 as mentioned above so that both the sheet table for the transmission reading and the second carrier 8 involved in the reflection reading can be commonly driven. It is also possible to link the sheet table for the transmission reading to the first carrier involved in the reflection reading. That is, a common sub-directional driving system can be utilized as both that of the reflection reading system and that of the transmission reading system. As a result, it is possible to miniaturize and reduce the cost of the image reading apparatus.

One example of an apparatus in the prior art used for the same purpose will now be described. This apparatus is an image reading apparatus disclosed in Japanese Laid-Open Patent Application No. 3-46864. This apparatus reads an original image realized on a sheet placed on a sheet table thereof, the reading being performed by scanning of the image by means of a reading optical system. The apparatus has the capability of reading an image realized on a transmitting sheet film after magnifying it by means of the following arrangement: An image-formation lens for the transmission reading and a device for illuminating the transmitting sheet from a position that is opposite with respect to the sheet to the position where the image sensor is located are attachable; and the image-formation lens is movable in the reading optical system. By this arrangement, it is possible to select a desired mode between two modes comprising a reflection reading mode and a transmission reading mode. Further, it is also possible to read an image realized on a transmitting sheet after magnifying it so as to read the image more accurately.

Another example of an apparatus in the prior art used for the same purpose will now be described. This apparatus is an image reading apparatus disclosed in Japanese Laid-Open Patent Application No. 3-55961. This apparatus reads an original image realized on a sheet placed on a sheet table thereof, the reading being performed by scanning of the image by means of a reading optical system. An image realized on a transmitting sheet such as a film is read by the following arrangement: A sheet table may be located so as to block a light path extending between a light source and an image-formation lens. By such an arrangement, it is possible to select the reflection reading and transmission reading modes as desired. Further, it is also possible to shorten the distance between the transmitting sheet and the image-formation lens in the transmission reading mode. As a result, an image can be read at high magnification and thus with high accuracy in the same mode.

Another example of an apparatus used for the same purpose will now be described. Such an apparatus is a carrier driving unit proposed by the applicant same as that of the present application, in Japanese Patent Application No. 4-182491 filed Jul. 9, 1992, inventors of which are Masanori Saito, Toyokazu Satomi and Toshiyuki Ando. This unit is used for an image scanner which reads an original image realized on a sheet placed on a reflecting sheet table thereof, the reading being performed by scanning of the image by means of a reading optical system. In the scanning, first and second carriers such as mentioned above are driven, the ratio of moving speeds between the first and second carriers being 2:1. A steel belt instead of the commonly used wire is used for driving one of the first and second carriers as described below. Further, a linear motor is used for driving the other one of the first and second carriers.

Respective FIGS. 2A and 2B show side elevation views of the above-mentioned second carriers, used in the above proposed carrier driving unit not shown in FIGS. 2A and 2B. As shown in FIGS. 2A and 2B, shifting pulleys 43a and 43b are rotatably supported on the side of the second carrier, the distance between the pulleys 43a and 43b being relatively small. Turning pulleys 44a and 44b are rotatably supported on an apparatus body 12 not shown in FIGS. 2A and 2B, the distance between the pulleys 44a and 44b being fixed. The steel belt 45 is wound on the shifting pulleys 43a and 43b so that a semicircle on each pulley is in contact with the belt 45. Further, the steel belt 45 is wound on the turning pulleys 44a and 44b so that a semicircle on each pulley is in contact with the belt 45. As shown in FIGS. 2A and 2B, both-direction portions of the belt 45 are first wound on the turning pulleys 44a and 44b so that both-direction portions of the belt extend in inward-pointing directions. Further, both-direction portions of the belt 45 extending after being wound on the respective turning pulleys 44a and 44b are then wound on the respective shifting pulleys 43a and 43b so that both-direction portions of the belt extend once again in outward-pointing directions. Further, both ends 48 of the belt 45 after being wound on the respective shifting pulleys 43a and 43b are then fixed on the apparatus body 12. The above-mentioned first carrier not shown in FIGS. 2A and 2B is clamped on the belt 45 at the clamping part 47.

FIG. 2A shows a state in which the shifting pulleys 43a and 43b linked to the second carrier are at a reading scanning start position. FIG. 2B shows a state in which the shifting pulleys 43a and 43b linked to the second carrier are at a reading scanning end position as a result of the scanning operation being executed through the shifting of shifting pulleys 43a and 43b from the reading scanning start position. By the above-mentioned arrangement, it is possible to improve the accuracy, with which the image is read with respect to the sub-scanning direction.

Generally speaking, there is a demand to read an original image realized on a transmitting sheet with a higher accuracy than in the case where an original image realized on a reflecting sheet is read. In order to fulfill such a demand in an apparatus in which both the reflection reading and the transmission reading may be performed, the following operation is required: Accuracy should be higher in the transmission reading than the reflection reading case, with which accuracy a carrier is driven in the sub-scanning direction so as to scan and thus read the image. However, such a function as making the sub-scanning driving accuracy higher is not described in any of the following three applications mentioned above: the application proposing the arrangement as shown in FIG. 1; Japanese Laid-Open Patent Application No. 3-46864; and Japanese Laid-Open Patent Application No. 3-55961.

The object of Japanese Patent Application No. 4-182491 mentioned above is to make the sub-scanning driving accuracy higher. However, the relevant arrangement shown in FIGS. 2A and 2B may create the following problems: The relevant assembling work may become difficult because the manner in which the belt 45 is wound on the pulleys 43a, 43b, 44a and 44b is complicated as shown in FIG. 2A and 2B. Further, the bending direction of the belt 45 is changed between the position at which the belt is wound on the shifting pulley 43a or 43b and the position at which the belt is wound on the turning pulley 44a or 44b. As a result of such a bending direction change, the driving of the carrier may not be executed smoothly. Further, in the arrangement of the proposed carrier driving unit, another belt is provided on the side of the carrier opposite to the side shown in FIGS. 2A and 2B. The belt length and the manner in which the belt is wound are different between both belts so that the belt winding manner is more complicated in one belt and belt length is longer in that belt. As a result, it is difficult to make the tension in both belts equal.

SUMMARY OF THE INVENTION

An object of the present invention is to provide an image scanning mechanism after eliminating the above-mentioned problems.

To achieve the above object of the present invention, an image scanning mechanism according to the present invention comprises direct driving means for moving, in a direct drive manner, at least one of a sheet, on which an original image to be read is realized, and an image reading system for reading said original image so that said image reading system progressively reads all of said original image accordingly.

As a result, it is possible to make the accuracy higher in the transmission reading in comparison to the reflection reading case, with which accuracy a carrier is driven so as to scan the image in the sub-scanning direction.

The image scanning mechanism may further have a feature wherein said direct driving means comprises a linear motor.

As a result, the direct driving means may be implemented with a simple arrangement comprising only a linear motor.

The image scanning mechanism may further comprise a guiding shaft for guiding the movement of said sheet or said image reading system, said linear motor being located approximately just below said guiding shaft.

As a result, a magnetic attracting force, generated between a driving magnet and a driven-side back yoke, both constituting the linear motor, acts to press the carrier onto the guiding shaft. Consequently, highly accurate driving of the carrier can be achieved without using any other pressing means for the same purpose.

The image scanning mechanism may further have a feature wherein said direct driving means comprises an ultrasonic motor.

As a result, the direct driving means may be implemented with a simple arrangement comprising only an ultrasonic motor.

The image scanning mechanism may further comprise:
- a first sheet table for a sheet of a first kind on which the original image is realized to be placed thereon;
- a first light source for illuminating said sheet of said first kind so that light reflected by said sheet of said first kind is used for reading said original image;
- a mirror for changing a direction, along which direction said light reflected by said sheet of said first kind lies, light reflected by said mirror being used for reading said original image;
- a first carrier for carrying said first light source;
- a second carrier for carrying said mirror;
- a first driving means for moving said first carrier so as to make said first light source illuminate all of said sheet of said first kind;
- a second driving means for moving said second carrier in response to the movement of said first carrier so as to make said light reflected by said mirror be suitably used for reading said original image;
- a second sheet table for a sheet of a second kind on which the original image is realized to be placed thereon, said second sheet table being mechanically carried by either said first carrier or said second carrier so as to be driven together with the corresponding one of said first light source and said mirror;
- a second light source for illuminating said sheet of said second kind so that light transmitted by said sheet of said second kind is used for reading said original image;

and wherein at least one of said first and second driving means comprises said direct driving means;
- at least one guiding shaft for guiding the respective movements of said first and second carriers;
- at least two pulleys rotatably supported on a first one of said first carrier and said second carrier;
- at least one belt wound on said two pulleys, both ends thereof being fixed, and the remaining second one of said first carrier and said second carrier being fixed onto a part of said belt, which part of said belt is a part extending of said two pulleys so that said remaining second one between said first carrier and said second carrier moves, with respect to the fixed ends of said belt, in response to said two pulleys moving together with said first one of said first carrier and said second carrier.

As a result, the relevant assembly work may be simplified for winding the belt and a bending direction change such as mentioned above may be prevented. Further, tensions of both belts may be equalized if a belt is provided on each side of the carrier. Consequently, it is possible not only to increase an accuracy in driving of the carrier for the transmission reading but also to increase an accuracy in the driving of the carrier for the reflection reading. Generally speaking, two carriers such as 7 and 8 in FIG. 1 are used for the reflection reading while one carrier (among the first and second carriers) may be directly driven (or in the direct driving manner) and the other carrier may be driven indirectly using the belt-pulley mechanism, the driving of the other carrier being executed in response to the movement of the directly driven carrier.

Other objects and further features of the present invention will become more apparent from the following detailed description when read in conjunction with the accompanying drawings.

BRIEF DESCRIPTION OF THE DRAWINGS

FIG. 3 shows a plan view of a first embodiment of an image scanning mechanism according to the present invention;

FIGS. 4A and 4B show side elevation views of pulleys and a belt wound on the pulleys of the above embodiment of the image scanning mechanism according to the present invention, FIG. 4A showing a scanning start position and FIG. 4B showing scanning end position;

FIG. 5 shows a front view of an image scanning mechanism, including a linear motor, according to a second embodiment of the present invention.

DESCRIPTION OF THE PREFERRED EMBODIMENTS

Figure 1:
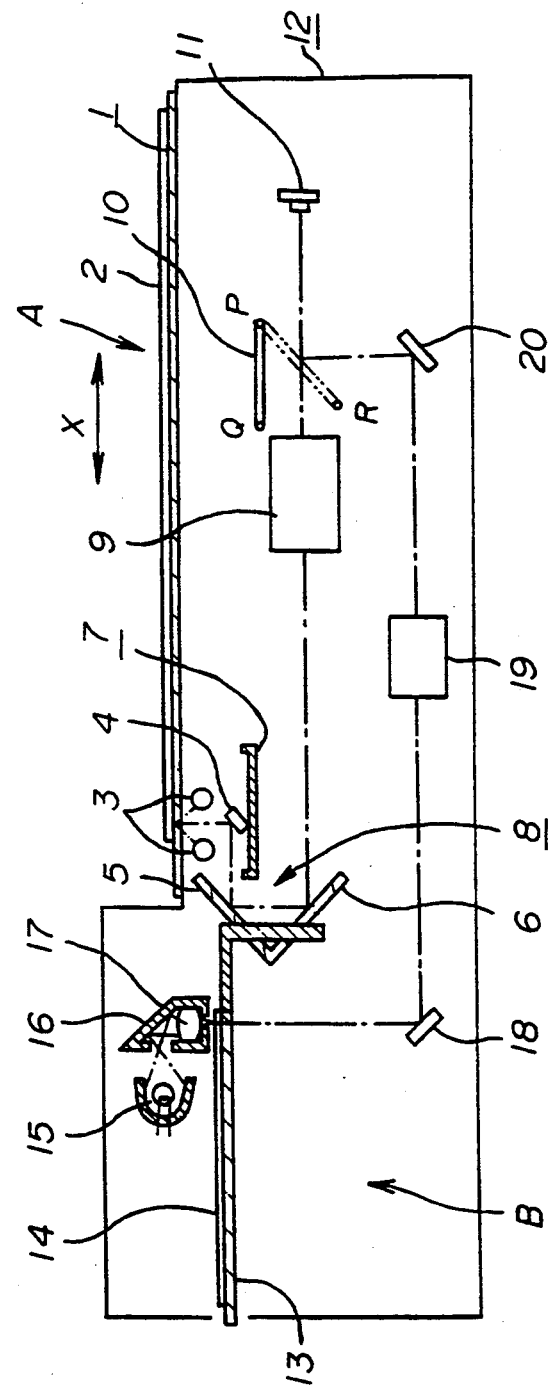
FIG. 1 shows a side elevation view of an internal arrangement of an image processing apparatus using an image scanning mechanism in a related art.
Figures 2A, 2B:
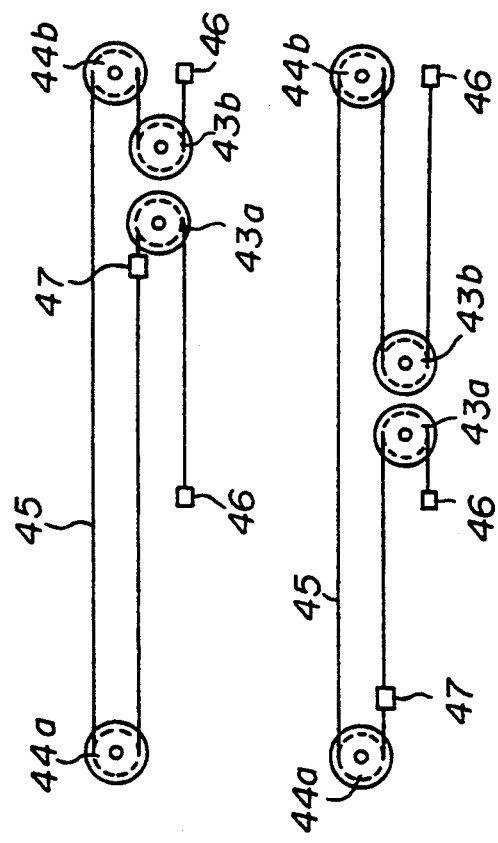
FIGS. 2A and 2B show side elevation views of pulleys and a belt wound on the pulleys used for an image scanning mechanism in a related art.

A relevant part of an image scanning mechanism according to a first embodiment of the present invention will now be described with reference to FIGS. 3, 4A and 4B. An overall general arrangement of the image scanning mechanism has been described above with reference to FIG. 1. Therefore, description concerning elements thereof already described above will be omitted and the same reference numerals are used for elements substantially the same.

The image scanning mechanism according to the first embodiment of the present invention uses a direct driving mechanism, described below, in which the second carrier 8 as shown in FIG. 1 is directly driven, the second carrier 8 being linked to the contact glass 13 acting as the sheet table for the transmission reading. In this embodiment, a linear motor is used as the prime mover in the direct driving mechanism. The first carrier 7 is driven, as described below, in response to the movement of the carrier 8 directly driven (or in the direct driving manner).

First and second guiding shafts 21 and 22 are respectively provided on the two sides of the first carrier 7 as shown in FIG. 3, the guiding shafts 21 and 22 being parallel to one another. Two plain bearings 7a and 7b are provided for slidably supporting the first carrier 7 along the first guiding shaft 21, and a single plain bearing 7c is provided for the same purpose but along the second guiding shaft 22. On the other hand, two plain bearings 8a and 8b are provided for movably supporting the second carrier 8 along the first guiding shaft 21, and two plain bearings 8c and 8d are provided for the same purpose but along the second guiding shaft 22.

Shifting pulleys 27 and 28 are provided, further towards the periphery of the apparatus than the first guiding shaft 21, on the second carrier 8. A first belt 24 extends between the shifting pulleys 27 and 28. Similarly, shifting pulleys 29 and 30 are provided, further towards the periphery of the apparatus than the first guiding shaft 22, on the second carrier 8, a second belt 28 extending between the shifting pulleys 29 and 30. Clamps 23 and 25 are respectively provided on the two ends of the first carrier 7, the clamp 23 clamping to a predetermined part of the first belt 24 and the clamp 25 clamping to a predetermined part of the second belt 26.

FIGS. 4A and 4B show side views of the arrangement associated with the first belt 24. In FIG. 4A, indicating a scanning start state, both belt ends 31a and 31b of the first belt 24 are fixed on the apparatus body 12 of the image processing apparatus containing the relevant image scanning mechanism. The first belt 24 is wound on both shifting pulleys 27 and 28 so that a semicircle on each pulley is in contact with the belt 24. Starting from the state of FIG. 4A, the second carrier 8, to which the contact glass 13 is linked, on which glass a transmitting sheet 14 is placed, is directly driven (or in the direct driving manner), along a sub-scanning direction Xa shown in FIG. 4A. As a result, a cooperative operation among the first belt 24 and the two shifting pulleys 27 and 28 (and another simultaneous cooperative operation among the second belt 28 and the two shifting pulleys 29 and 30) causes the first carrier 7, fixed on the belts 24 and 28 by the respective clamps 23 and 25, to move in the direction Xa at a speed twice that at which the second carrier 8 moves. Thus, the image reading operation for the image realized on the transmitting sheet 14 is progressively executed. Then, after the image reading operation is finished, the cooperative operation among first belt 24 and two shifting pulleys 27 and 28 is terminated in the state of a reading end position shown in FIG. 4B. During the cooperative operation between the states of FIG. 4A and FIG. 4B, the shifting pulley 27 is shifted from the position $a_1$ of FIG. 4A to the position $a_2$ of FIG. 4B. Simultaneously, the shifting pulley 28 is shifted from the position $b_1$ of FIG. 4A to the position $b_2$ of FIG. 4B. Because the belt ends 31a and 31b are unchanged on the apparatus body 12 as mentioned above, the positions thereof are fixed between the states of FIGS. 4A and 4B. Further, description of the manner in which the second belt 26 is wound on the shifting pulleys 29 and 30 and the cooperative operation among the second belt 26 and the two pulleys 29 and 30 is omitted because those are similar to those, mentioned above, concerning the first belt 24 and the corresponding two pulleys 27 and 28.

A shifting back yoke 33 and coils 34 are mounted on the bottom of the second carrier 8. A plurality of magnets 35 are linearly arranged, on the apparatus body 12, below and apart by a predetermined gap from the coils 34, the plurality of magnets 35 having alternately arranged South and North (or S and N) poles. A fixed back yoke 35a is provided below the magnets 35 and is fixed to the apparatus body 12, as shown in FIG. 5. A multi-pole linear direct-current motor 36 is constituted by the shifting back yoke 33, coils 34, magnets 35 and fixed back yoke 35a. A driving control device, not shown in the drawings, causes electric current to flow through the coils 34 so that the second carrier 8 is driven along the sub-scanning direction. Such a driving mechanism (manner), in which no intermediate power transfer mechanism is used between the prime mover, the linear motor 36 and the second carrier 8, is referred to as a direct driving mechanism (manner).

Applying the direct driving mechanism to the mechanism in which the second carrier 8 is driven enables driving of the second carrier 8 for the transmission reading with higher accuracy in comparison to the mechanism in which the first carrier 7 for the reflection reading is driven. Further, applying a linear direct-current motor to the prime mover in the relevant direct driving mechanism enables realization of an image scanning mechanism, in which the transmission reading is performed with high accuracy by a simple arrangement of the linear motor. Further, the arrangement shown in FIGS. 4A and 4B enables the first and second belts 24 and 26 to be assembled easily. Further, this arrangement of the belts 24 and 28 also prevents the belts 24 and 26 from undergoing a change of bending direction as mentioned above. Further, the same arrangements are applied to the belt-pulley mechanisms on both sides, such as shown in FIGS. 4A and 4B, of the second carrier 8. As a result, the tensions of the belts 24 and 26 can be equalized. The above-mentioned functions preventing the change of bending direction and allowing equalizing of the tensions enable the first carrier 7 for the reflection reading to be driven with high accuracy, in addition to the high-accuracy transmission reading performance.

Linear motors which can be used in embodiments of the present invention are not limited to those such as that mentioned above, the linear direct-current motor 36, but also a single-pole voice-coil type linear direct-current motor or a linear pulse motor may be used. Further, the mechanism for movably supporting the carriers 7 and 8 along the guiding shafts 21 and 22 in the embodiment of the present invention are not limited to those comprising the plain bearings 7a, 7b, 8a and 8b mentioned above. Mechanisms achieving the same purpose may be implemented by a sliding bearing such as that resulting from a combination of a circular-section shaft and a circular hole in which the circular-section shaft is inserted and slides therein. Alternatively, a mechanism may be used for the same purpose, such as that comprising a combination of a rolling bearing and a pressing mechanism. The pressing mechanism is provided on the carrier and acts so as to cause the wheel, rotatably supported onto the carrier, to be pressed onto the fixed shaft in order to prevent the wheel from escaping from the fixed shaft. Furthermore, alternatively the following construction of rolling bearings may be used for the same purpose: A plurality of balls or rollers are provided between a fixed shaft and an enclosure. The enclosure is provided onto the carrier and encloses the fixed shaft via the plurality of balls of rollers. Thus, the carrier may move on the fixed shaft while the plurality of balls or rollers are rolling between the enclosure and the fixed shaft.

A second embodiment of an image scanning mechanism according to the present invention will now be described with reference to FIG. 5. Description concerning elements substantially the same as those of the first embodiment of the image scanning mechanism mentioned above will be omitted, the same reference numerals being designated to elements substantially the same.

The second embodiment shown in FIG. 5 is an embodiment having the linear direct-current motor 36 located approximately just below the first guiding shaft 21 for the second carrier 8. A bracket 38 is provided so as to enable the arrangement of the linear motor 36 and the first guiding shaft 21 as mentioned above, the bracket 38 supporting a shaft 37 on which the shifting pulley 27 is then rotatably supported and the plain bearing 8a of the second carrier 8 is supported. (There, the plain bearings 8a, 8b, 8c and 8d, and 7a, 7b and 7c are fixed on the respective shafts mounted on the respective carriers 7 and 8, and these bearings may slide on and along the respective guiding shafts 21, 22.) Further, a spacer 39 is provided below the fixed back yoke 35a constituting a part of the linear motor 36, the spacer being used for adjusting the height of the linear motor 36 as is appropriate.

The above-mentioned arrangement of the first guiding shaft 21 and the linear motor 36 located just below the shaft 21 enables a magnetic attraction force generated by the motor 36 between the magnets 35 fixed on the apparatus body 12 and the shifting back yoke 33 fixed on the second carrier 8 to be utilized. This attraction force enables the plain bearing 8a to be pressed onto the first guiding shaft 21. As a result, no other special-purpose pressing device is needed but high accurate driving of the second carrier 8 is realized.

A third embodiment of an image scanning mechanism according to the present invention will now be described with reference to FIG. 6. Description concerning elements substantially the same as those of the first embodiment of the image scanning mechanism mentioned above will be omitted, the same reference numerals being designated to elements substantially the same.

Figure 6:
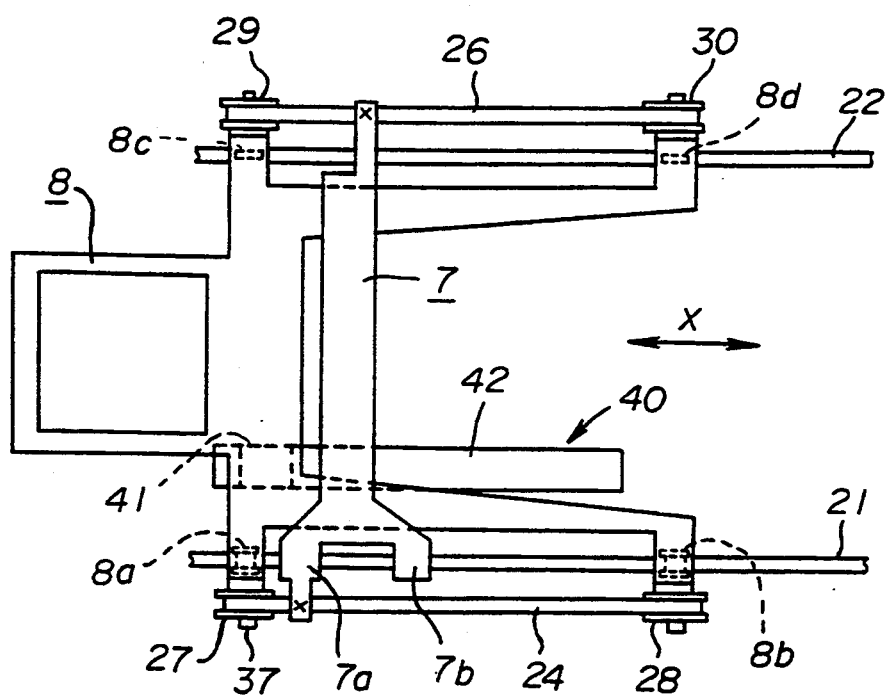
FIG. 6 shows a plan view of a third embodiment of an image scanning mechanism, including an ultrasonic motor, according to the present invention.

The third embodiment shown in FIG. 6 is an embodiment using an ultrasonic motor 40 as the prime mover in the direct driving mechanism. The ultrasonic motor 40 comprises a shifter 41 and a stator 42. The shifter 41 is fixed onto the second carrier 8 and the linear stator 42 is fixed onto the apparatus body 12.

Such an ultrasonic motor is described in a book, *Ultramodern actuator*, published by Technology Investigation Association on Dec. 15, 1988, compiled by Mechatronics Editing Section, Section 17. *Ultrasonic Motor*, pages 145–150. Such a motor is also described in a book, *Motor Application Technique*, a special edition of the magazine, *Nikkei Mechanical*, Section 7, *Ultrasonic Motor*, published on Dec. 17, 1990, pages 194–203, written by Yoshiro Tomikawa and Takehiro Takano.

In such an ultrasonic motor, a stator such as 42 comprises a vibration member which vibrates in an ultrasonic manner so as to cause a shifter such as 41 to move, in a predetermined direction, through friction effected therebetween.

The ultrasonic motor 40 may drive, in the direct driving mechanism, along the sub-scanning direction X, the second carrier 8 linked to the contact glass 13 for the transmission reading. Applying the ultrasonic motor 40 to the prime mover in the direct driving mechanism enables easy realization of an image scanning mechanism: wherein the second carrier 8 for the transmission reading is driven with a higher accuracy in comparison to the mechanism in which the first carrier 7 is driven.

In each of the first, second and third embodiments according to the present invention mentioned above, the optical system selectable for either the reflection reading mode or transmission reading mode is used. Further in each of the embodiments, the second carrier 8 is directly driven (or in the direct driving manner), the second carrier being used for the reflection reading and being linked to the contact glass 13 for the transmission reading. However, instead of the above arrangement, another arrangement described below may be used in the embodiments. That is, the contact glass 13 for the transmission reading may be linked to the first carrier 7 and the parts of the linear motor or ultrasonic motor may be mounted on the first carrier 7. Thus, the first carrier 7 can be directly driven (or driven in the direct driving mechanism). Instead, it is also possible for the parts of the linear motor or ultrasonic motor to be directly mounted on the contact glass 13 and directly driven (or in the direct driving manner).

Further, the present invention is not limited to the above described embodiments, and variations and modifications may be made without departing from the scope of the present invention.

What is claim is:

1. An image scanning mechanism, comprising:
   a direct driving means for moving, in a direct drive manner, at least one of a sheet, on which an original image to be read is realized, and an image reading system for reading said original image so that said image reading system progressively reads all of said original image accordingly,
   a first sheet table for a sheet of a first kind on which the original image is realized to be placed thereon;
   a first light source for illuminating said sheet of said first kind so that light reflected by said sheet of said first kind is used for reading said original image;
   a mirror for changing a direction, along which direction said light reflected by said sheet of said first kind lies, light reflected by said mirror being used for reading said original image;
   a first carrier for carrying said first light source;
   a second carrier for carrying said mirror;
   a first driving means for moving said first carrier so as to make said first light source illuminate all of said sheet of said first kind;
   a second driving means for moving said second carrier in response to the movement of said first carrier so as to make said light reflected by said mirror be suitably used for reading said original image;
   a second sheet table for a sheet of a second kind on which the original image is realized to be placed thereon, said second sheet table being mechanically carried by either said first carrier or said second carrier so as to be driven together with the corresponding one of said first light source and said mirror;

a second light source for illuminating said sheet of said second kind so that light transmitted by said sheet of said second kind is used for reading said original image;

and wherein at least one of said first and second driving means comprises said direct driving means.

2. The image scanning mechanism according to claim 1, further comprising:

at least one guiding shaft for guiding the respective movements of said first and second carriers;

at least two pulleys rotatably supported on a first one of said first carrier and said second carrier;

at least one belt wound on said two pulleys, both ends of said belt being fixed, and a remaining second one of said first carrier and said second carrier being fixed onto a part of said belt, which part of said belt is a part extending from said two pulleys so that said remaining second one of said first carrier and said second carrier moves, with respect to the fixed ends of said belt, in response to said two pulleys moving together with said first one of said first carrier and said second carrier.

3. The image scanning mechanism according to claim 2, wherein:

said at least one guiding shaft comprises two guiding shafts, each guiding shaft being parallel to a plane, on which said sheet of said first kind and said sheet of said second kind extend, being parallel to one another, and extending along the direction of the movement of said first carrier and said second carrier;

said remaining second one of said first carrier and said second carrier being guided at least at one position on each of said two guiding shafts;

said first one of said first carrier and said second carrier being guided at least at one position on each of said two guiding shafts;

said at least two pulleys comprising two pairs of pulleys, said pulleys in each pair thereof being mounted on either side of said first one of said first carrier and said second carrier; and said at least one belt comprising two belts, each wound on a respective pair of said two pairs of pulleys, each belt winding so that substantially a semicircle of each pulley is in contact with the corresponding belt, both ends of each belt being fixed, and said remaining second one of said first carrier and said second carrier being fixed onto a part of each belt, which part of each belt is a part extending between the corresponding pair of pulleys so that said remaining second one of said first carrier and said second carrier moves, with respect to the fixed ends of each belt, in response to said two pairs of pulleys moving together with said first one of said first carrier and said second carrier.

4. An image scanning mechanism, comprising:

a linear motor for moving, in a direct driving manner, at least one of a sheet, on which an original image to be read is realized, and an image reading system for reading said original image so that said image reading system scans said original image;

a guiding shaft for guiding the movement of said one of said sheet and said image reading system; and wherein said linear motor is positioned with respect to a position of said guiding shaft so that a magnetic effect provided by said linear motor increases the guiding effect provided by said guiding shaft.

5. The image scanning mechanism according to claim 4, further comprising:

a carrier directly driven by said linear motor for carrying said one of said sheet and said image reading system, said carrier provided with a bearing with which said guiding shaft comes into contact so that said guiding shaft guides the movement of said carrier;

and, wherein:

said linear motor comprises a coil and a magnet, said coil being fixed on said carrier and said magnet being fixed on a base on which said guiding shaft is fixed, and said bearing being disposed on said guiding shaft and said linear motor being disposed below said guiding shaft.

* * * * *